(12) United States Patent
Tu et al.

(10) Patent No.: US 11,449,481 B2
(45) Date of Patent: Sep. 20, 2022

(54) DATA STORAGE AND QUERY METHOD AND DEVICE

(71) Applicant: Alibaba Group Holding Limited, Grand Cayman (KY)

(72) Inventors: Jiye Tu, Hangzhou (CN); Chuangxian Wei, Hangzhou (CN); Chaoqun Zhan, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/894,575

(22) Filed: Jun. 5, 2020

(65) Prior Publication Data

US 2020/0301899 A1   Sep. 24, 2020

Related U.S. Application Data

(63) Continuation of application No. PCT/CN2018/118869, filed on Dec. 3, 2018.

(30) Foreign Application Priority Data

Dec. 8, 2017 (CN) .......................... 201711296260.8

(51) Int. Cl.
*G06F 16/22* (2019.01)
*G06F 16/2453* (2019.01)

(52) U.S. Cl.
CPC ...... *G06F 16/221* (2019.01); *G06F 16/24542* (2019.01)

(58) Field of Classification Search
CPC ............. G06F 16/221; G06F 16/24542; G06F 16/2453
See application file for complete search history.

(56) References Cited

U.S. PATENT DOCUMENTS

| 6,029,163 | A  | * | 2/2000 | Ziauddin ............ G06F 16/2462 |
| 6,738,790 | B1 |   | 5/2004 | Klein et al. |
| 7,962,521 | B2 |   | 6/2011 | Brown et al. |
| 8,700,674 | B2 |   | 4/2014 | Bear et al. |

(Continued)

FOREIGN PATENT DOCUMENTS

| CN | 102541916 | 7/2012 |
| CN | 103049473 | 4/2013 |
| CN | 104361099 | 2/2015 |

OTHER PUBLICATIONS

Translation of International Search Report for corresponding PCT Application No. PCT/CN2018/118869 dated Mar. 11, 2019, a counterpart foreign application for U.S. Appl. No. 16/894,575, 2 pages.

(Continued)

*Primary Examiner* — Dangelino N Gortayo
(74) *Attorney, Agent, or Firm* — Lee & Hayes, P.C.

(57) ABSTRACT

Data storage and query method and device are disclosed, which facilitate a quick acquisition of query results through index queries at subsequent stages by establishing indexes for columns of a table. Furthermore, by scanning data in the table to obtain statistical information of data in the columns, this facilitates using the statistical information of the data in the columns to perform cost estimation in subsequent queries, in an attempt to obtain a data query mode that has the least cost and the best performance, thus improving query efficiency.

19 Claims, 8 Drawing Sheets

(56) References Cited

U.S. PATENT DOCUMENTS

| | | | |
|---|---|---|---|
| 8,903,805 B2 | 12/2014 | Lee et al. | |
| 8,935,233 B2 * | 1/2015 | Agrawal | G06F 16/2228 |
| | | | 707/718 |
| 9,117,030 B2 * | 8/2015 | Singhal | G06F 11/3696 |
| 9,529,912 B2 | 12/2016 | Liu et al. | |
| 9,846,567 B2 | 12/2017 | Kaushik | |
| 10,133,800 B2 | 11/2018 | Chaiken et al. | |
| 10,229,157 B2 | 3/2019 | Collins et al. | |
| 10,255,234 B2 * | 4/2019 | Booman | G06F 16/211 |
| 10,394,848 B2 | 8/2019 | Gupta | |
| 10,496,283 B2 | 12/2019 | Waghulde | |
| 10,860,562 B1 * | 12/2020 | Gupta | G06F 16/2453 |
| 2009/0271694 A1 * | 10/2009 | Bayliss | G06F 16/951 |
| | | | 715/219 |
| 2011/0314027 A1 | 12/2011 | Xu et al. | |
| 2016/0042019 A1 | 2/2016 | Oks et al. | |
| 2016/0173122 A1 * | 6/2016 | Akitomi | G06F 16/221 |
| | | | 707/693 |
| 2016/0210324 A1 * | 7/2016 | Manamohan | G06F 16/2358 |
| 2018/0096006 A1 * | 4/2018 | Das | G06F 16/217 |
| 2019/0102411 A1 * | 4/2019 | Hung | H04L 41/0856 |

OTHER PUBLICATIONS

Translation of Written Opinion for corresponding PCT Application No. PCT/CN2018/118869 dated Mar. 11, 2019, a counterpart foreign application for U.S. Appl. No. 16/894,575, 4 pages.

\* cited by examiner

DATA STORAGE AND QUERY METHOD AND DEVICE

CROSS REFERENCE TO RELATED PATENT APPLICATIONS

This application claims priority to and is a continuation of PCT Patent Application No. PCT/CN2018/118869 filed on 3 Dec. 2018, and is related to and claims priority to Chinese Application No. 201711296260.8, filed on 8 Dec. 2017 and entitled "Data Storage and Query Method and Device," which are hereby incorporated by reference in their entirety.

TECHNICAL FIELD

The present specification relates to the field of computers, and particularly to data storage and query methods and devices.

BACKGROUND

With ever-growing social and economic developments, science and technology are also making rapid progress. In recent years, mobile Internet technologies and Internet of Things technologies have become more and more popular, and have brought great convenience to people's lives, while ushering in the coming of the era of big data. Today, from academia to industry, from organizations to individuals, data with great value is being generated all the time. This data can bring huge economic benefits to enterprises and businesses, and can also benefit human health and social developments if used properly. However, this valuable data not only has problems such as missing data, messy data, different formats, and a diversity of sources, but also has a tremendous size of data volume.

According to IBM research, 90% of all data obtained by the entire human civilization was generated within the past two years. The growth rate of future data volume will be faster and faster. Faced with such a huge amount of data, conventional computer data analysis technologies have become more and more inadequate and find it difficult to meet the performance requirements of people for massive data analysis. How to quickly and conveniently query and select valuable information from such data has become an important problem to be solved urgently.

When dealing with the problems of massive data analysis, data is often converted into a structured representation, that is, the data is converted into a table format composed of rows and columns. Each row represents a record, and each record is composed of several columns. Each column is a specific field that represents a part of information of the record.

In current technologies, methods used for performing a structured data query are mainly divided into two types. One is a data query method based on disk scanning, and the other is a data query method based on a partial index.

The data query method based on disk scanning is mainly completed by the following two steps.

Step 1: Data storage. Convert data into row and column representations, and store them continuously on the disk row by row.

Step 2: Data analysis. Read the data stored on the disk sequentially, perform filtering according to a filter condition that is inputted, and output data that meets the filter condition while ignoring data that does not meet the condition.

The data query method based on a partial index is relatively complicated, and generally includes the following steps.

Step 1: Data storage. Convert the data into row and column representations, and store them continuously on the disk row by row.

Step 2: Create an index on a specified column. Obtain a specified column from an input, and build a partial index on the column.

Step 3: Simple query optimization. Obtain a query condition from an input, and perform optimization according to the index constructed at step 2, to convert the query condition into an equivalent query condition with shorter time consumption.

Step 4: Data query. Perform data filtering based on the query condition that has/have been optimized at step 3, and retain data that satisfies the condition, while ignoring data that does not satisfy the condition.

Two query methods for structured data have been briefly described above: a data query method based on disk scanning and a data query method based on a partial index.

The data query method based on disk scanning requires reading all data from the disk each time when a data query analysis is performed. The query speed thereof is very slow, and the efficiency is very poor. When an amount of data reaches a certain level, the time spent by this method may be extremely large, and it is difficult to meet the performance requirements of people for data analysis systems. In addition, reading all the data on the disk in order to query a small amount of data that satisfies conditions is also a great waste of resources.

The data query method based on a partial index makes an improvement on the basis of the former method, and takes advantage of pre-built partial indexes to speed up a query process. Each data query analysis only needs to first query the indexes to get a specific location of data that fulfill a condition on a disk, and then read the data at the corresponding location from the disk. This method eliminates the need of reading the entire disk every time, and reducing time consumption. However, this method only builds indexes for a portion of columns, which means that only the columns that have been indexed can avoid scanning of the entire disk. Columns that are not indexed still need to be queried through disk scanning. Therefore, an acceleration effect of this method for data query analyses is limited. In the absence of indexing, the performance is still low and the query speed is slow. Another problem with the data query method is that it is limited to using only one of multiple indexes for data query analysis. Even if multiple columns are specified for index creation, it cannot use associated information between multiple indexes for query optimization, resulting in unnecessary disk reads.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

An objective of the present disclosure is to provide data storage and query method and device, which can solve the problems of poor efficiencies of data queries and analyses of massive data in existing solutions.

In implementations, a data storage method is provided. The method includes:

storing data according to a row and column storage structure; and performing an index construction on columns of the stored data to establish index information.

In implementations, the method further includes:

obtaining, for a column of the stored data, statistical information of data in the column.

Further, in the method, the statistical information of the data in the column includes one or more of: maximum and minimum values of numbers in the column, a mapping relationship between null values in the column and row numbers, a number of occurrences of each piece of data in the column, and a number of different pieces of data in the column.

In implementations, performing the index construction on the columns of the stored data to establish the index information includes:

establishing index information of the stored columns by scanning the stored data, the index information of the columns including mapping relationships between data in the columns and row numbers of rows in a table, and the mapping relationships being ordered according to respective data sizes of the columns.

In implementations, establishing the index information of the stored columns includes:

creating index information for all the stored columns.

In implementations, while establishing the index information of the stored columns, the method further includes:

establishing an association relationship between the index information of the stored columns.

In implementations, a method for querying data that is stored using the above data storage method is also provided. The method includes:

obtaining query condition(s); and obtaining a row number set of rows corresponding to stored data satisfying the query condition(s) according to index information of stored columns.

In implementations, obtaining the row number set of the rows corresponding to the stored data satisfying the query condition(s) according to the index information of the stored columns includes:

determining a corresponding query mode according to statistical information of data in the columns, and obtaining the row number set of the rows corresponding to the stored data satisfying the query condition(s) according to the query mode and the index information of the stored columns.

In implementations, before obtaining a row number set of rows corresponding to stored data satisfying each individual query condition, the method further includes:

combining a plurality of individual query conditions into a single query condition according to an association relationship between the index information of the stored columns, wherein the index information of the columns includes mapping relationships between the data in the columns and row numbers of stored rows, the mapping relationships being sorted according to respective data sizes of the columns.

In implementations, combining the plurality of individual query conditions into the single query condition according to the association relationship between the index information of the stored columns includes:

combining a respective result from an obtained row number set of data that satisfies each individual query condition each time according to a combination of the query conditions to obtain a combined result; and aggregating the combined results.

In implementations, the statistical information of the data in the columns includes one or more of: maximum values and minimum values of the data in the columns, mapping relationships between null values in the columns and row numbers, a number of occurrences of each data in the columns and numbers of different data in the columns.

In implementations, the query condition(s) include(s) one or more of a null value query, an equivalent query, and a range query.

In implementations, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are a null value query, determining a query mode that uses the mapping relationships between the null values in the columns and the row numbers for performing a search according to the statistical information of the mapping relationships between the null values in the columns and the row numbers; and obtaining the row number set of the rows corresponding to the data satisfying the query condition(s) from a table according to the query mode and the index information of the stored columns.

In implementations, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query or a range query, obtaining columns to be queried and data to be queried from individual query conditions;

determining whether a range between a maximum value and a minimum value of data of a column to be queried in each individual query condition is within a range between a maximum value and a minimum value of data in the statistical information of the column, if being not within the range, returning a null set; and if being within the range, determining the corresponding query mode according to the statistical information of the data in the columns, and obtaining the row number set of the rows corresponding to the stored data satisfying the query condition(s) according to the query mode and the index information of the columns.

In implementations, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query, obtaining a number of occurrences of data to be queried in a column from the number of occurrences of each data in the statistical information of the columns, and determining whether a percentage of the number of occurrences of the data to be queried with respect to a total number of rows in the column exceeds a preset percentage threshold;

if affirmative, scanning all the data in the column to obtain the row number set of the data that satisfies the individual query conditions; and If not, searching for the row number set of data that satisfies the individual query conditions from the index information of the columns.

In implementations, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query, estimating a number of occurrences of data to be queried in a column according to a number of rows in the column and a number of different data in the statistical information of the columns, and determining whether the estimated number of occurrences of the data to be queried with respect to a total number of rows in the column exceeds a preset percentage threshold;

if affirmative, scanning all the data in the column to obtain a row number set of data that satisfies the individual query conditions; and if not, searching for the row number set of data that satisfies the individual query conditions from the index of the column.

In implementations, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are a range query, comparing whether a range between a maximum value and a minimum value of data of a column to be queried in the query condition is a preset range threshold of a range between a maximum value and a minimum value of the data in the statistical information of the column;

if affirmative, scanning all data in the column to obtain a row number set of data that satisfies the query condition; and if not, using the maximum value and the minimum value of the data to be queried in the column as a starting point and an ending point of a search respectively, to search for a row number set of the data satisfying the query condition(s) from an index of the column.

In implementations, a data storage device is also provided. The device includes:

a data formatting module configured to store data according to a row and column storage structure; and an index building module configured to perform index construction on columns of the stored data to establish index information.

In implementations, a device for querying data stored by the above data storage device is also provided. The device includes:

query optimization and data query modules configured to obtain query condition(s), and obtain a row number set of rows corresponding to stored data that satisfies the query condition(s) according to index information of stored columns.

In implementations, a computing-based device is also provided, which includes:

processor(s); and memory arranged to store computer-executable instructions, the computer-executable instructions, when executed, causing the processor(s) to:

store data according to a row and column storage structure; and perform an index construction on columns of the stored data to establish index information.

In implementations, a computing-based device is also provided, which includes:

processor(s); and memory arranged to store computer-executable instructions, the computer-executable instructions, when executed, causing the processor(s) to:

obtain query condition(s); and determine a corresponding query mode according to statistical information of data in columns of a table, and obtain a row number set of rows corresponding to data in the table that satisfies the query condition(s) according to the query mode, wherein the table includes rows and columns, and the rows in the table are compiled with row numbers.

In implementations, the present disclosure also provides a computer-readable storage medium, on which computer-executable instructions are stored, wherein the computer-executable instructions, when executed by processor(s), cause the processor(s) to:

store data according to a row and column storage structure; and perform an index construction on columns of the stored data to establish index information.

In implementations, the present disclosure also provides a computer-readable storage medium, on which computer-executable instructions are stored, wherein the computer-executable instructions, when executed by processor(s), cause the processor(s) to:

obtain query condition(s); and obtain a row number set of rows corresponding to stored data that satisfies the query condition(s) according to index information of stored columns.

In implementations, a data storage method is also provided, which includes:

storing data according to a row and column storage structure; and performing an index construction on columns and/or rows of the stored data to establish index information.

The present disclosure constructs indexes of columns in a table, so that a query result can be quickly obtained through a query index subsequently. In addition, by scanning data in the table to obtain statistical information of data in the columns, it is convenient to use the statistical information of the data in the columns in subsequent queries for performing cost estimation to obtain a data query mode with the lowest cost and the best performance, thus improving the query efficiency.

BRIEF DESCRIPTION OF THE DRAWINGS

By reading and referencing the following drawings for a detailed description of non-limiting embodiments, other features, objectives, and advantages of the present disclosure will become more apparent.

Same or similar reference numerals in the drawings represent same or similar components.

DETAILED DESCRIPTION

The present disclosure will be described in further detail hereinafter with reference to the drawings.

Figure 1:
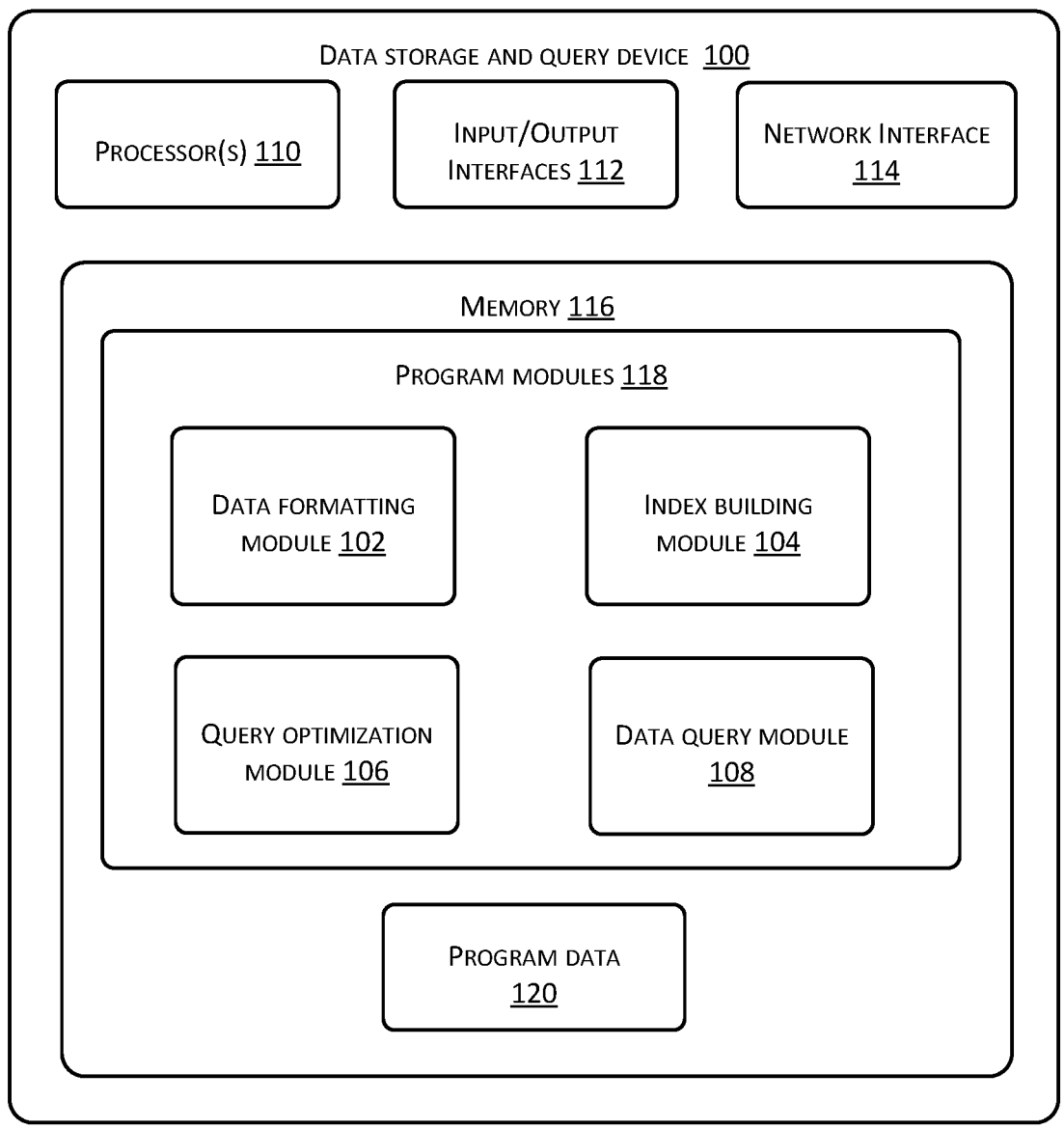
FIG. 1 shows a modular diagram of data storage method and device according to an embodiment of the present disclosure.

According to the embodiments of the present disclosure, as shown in FIG. 1, a data query and storage device 100 may include a data formatting module 102, an index building module 104, a query optimization module 106, and a data query module 108.

The data formatting module 102 is used for data format conversion, converting original data including multiple pieces of data into required structured data, i.e., storing each piece of data into a table including rows and columns, and assigning row numbers to the rows in the table.

The index building module 104 is used for scanning the data in the table, establishing indexes of the columns in the table, and obtaining statistical information of respective data in the columns, the indexes of the columns including mapping relationships between the respective data in the columns and the row numbers of the rows of the table, the mapping relationships being sorted according to a respective data size of each column.

The query optimization module 106 is used for determining an optimized query mode for a query condition based on the statistical information of the respective data in the columns of the table that is constructed, and/or performing equivalent rewriting of the query condition, the purpose thereof being to perform a query at a faster speed and a lower cost.

The data query module 108 is used for finally performing an actual query operation according to the determined optimized query mode and/or the equivalently rewritten query condition, to obtain a row number set of data that fulfill the query condition, i.e., a result set.

In implementations, the data query and storage device 100 may include a terminal, a device of a service network, and a trusted party. In implementations, the data query and storage device 100 may further include one or more processors 110, an input/output interface 112, a network interface 114, and memory 116. In implementations, the memory 116 may include program modules 118 (such as one or more of the above modules) and program data 120.

The memory 116 may include a form of computer-readable media such as a volatile memory, a random access memory (RAM) and/or a non-volatile memory, for example, a read-only memory (ROM) or a flash RAM. The memory 116 is an example of a computer-readable media.

The computer-readable media may include a volatile or non-volatile type, a removable or non-removable media, which may achieve storage of information using any method or technology. The information may include a computer-readable instruction, a data structure, a program module or other data. Examples of computer-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

The present disclosure also provides a data storage method, which includes:

storing data according to a row and column storage structure; and performing an index construction on columns of the stored data to establish index information.

In an embodiment of the present disclosure, the data storage method further includes:

obtaining statistical information of data in the columns for the columns of the stored data.

The present disclosure also provides a data storage method, which includes:

Step S11: Storing each piece of data into a table including rows and columns; (here, original data including multiple data can be converted into a tabular form of row and column structures)

Step S12: Assigning row numbers for the rows in the table;

Step S13: Obtaining statistical information of respective data in the columns by scanning the data in the table.

Figure 2:
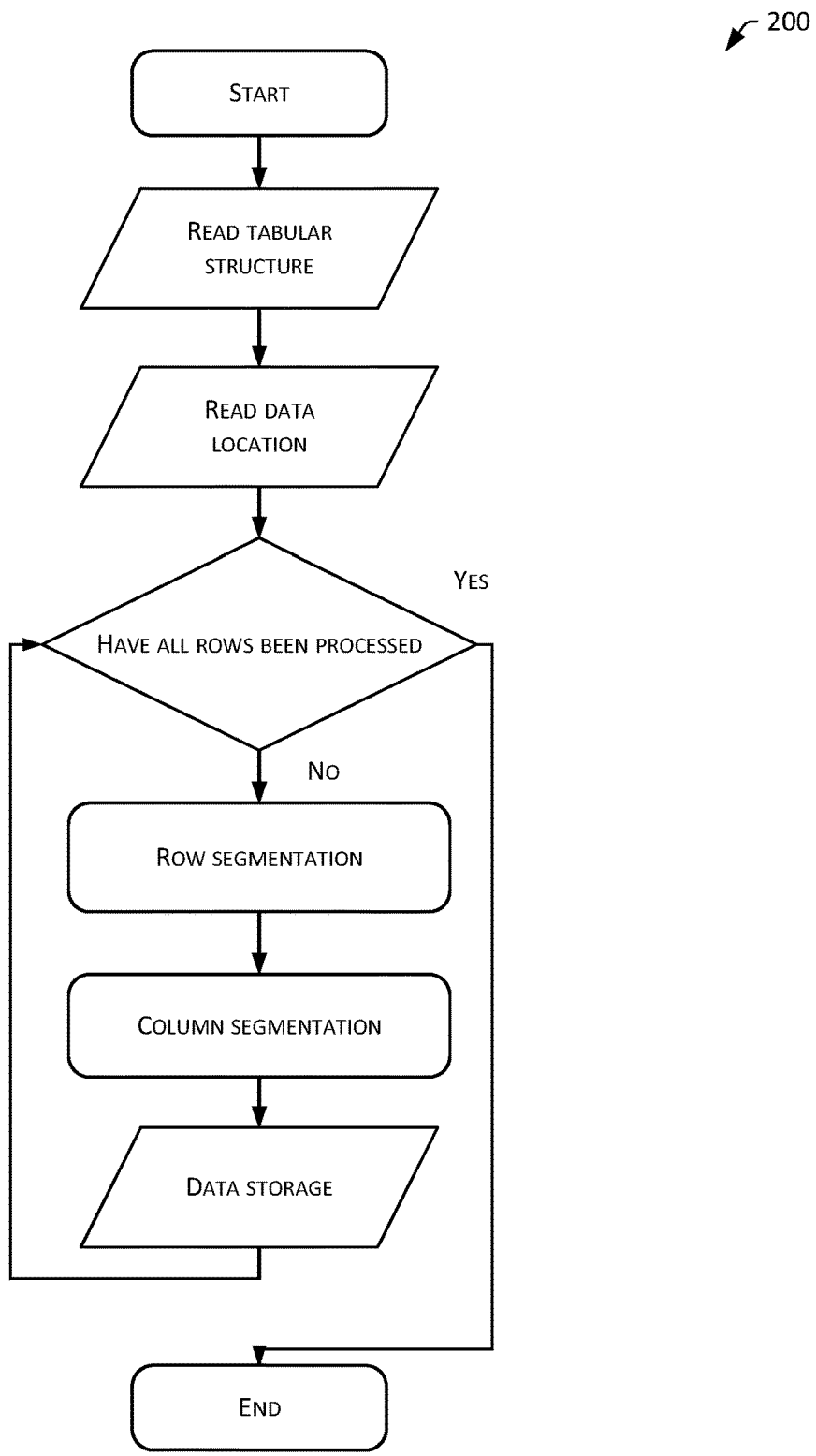
FIG. 2 shows a flowchart of storing each data into a table including rows and columns according to an embodiment of the present disclosure.

Specifically, as shown in FIG. 2, a method 200 of storing each piece of data into a table including rows and columns may include the following steps:

1) Obtaining a definition of a tabular structure inputted by a user from an input interface, which includes how many columns the table includes, a type of each column, a name of each column, a row separator, and a column separator. Types of columns that are supported include the following types: short, int, long, float, double, varchar, byte, boolean, and decimal. The row separator may be a newline by default, and the column separator may be a comma by default.

2) Obtaining a data source inputted by the user from the input interface, i.e., a data storage location.

3) Reading the user data from the data source, and segmenting the user data according to the line separator to obtain a collection of multiple rows of data.

4) Segmenting each row of data according to the column separator, and placing the segmented data into corresponding cells of the table.

5) Storing the segmented data on the disk.

The present embodiment obtains statistical information of respective data in columns by scanning data in a table, so that the statistical information of the respective data in the columns can be used in subsequent queries for performing cost estimation, to obtain a data query mode having the minimum cost and the optimal performance to improve query efficiency.

In a data storage method according to an embodiment of the present disclosure, the statistical information of the respective data in the columns may include one or more of: a maximum value (Max), a minimum value (Min), a mapping relationship between a null value (Null) in a column and a row number, a number of occurrences of each piece of data in the column (histogram, His), and a number of different pieces of data in the column (a number of distinct values, Distinct).

Specifically, collecting statistical information related to data can include the following:

1) For each column of data, scan all data in that column, and maintain a number of variables: a maximum value (Max), a minimum value (Min), a mapping relationship from a null value (Null) in the column to a row number, a number of occurrences of each piece of data in the column (histogram, His) and a number of different pieces of data in the column (a number of distinct values, Distinct);

2) For a currently scanned piece of data, if being greater than Max, update Max to a currently scanned value;

3) For the currently scanned piece of data, if being less than Min, update Min to the currently scanned value;

4) For the currently scanned piece of data, if being null, add Null by one and establish a mapping of Null→DocId;

5) For the currently scanned piece of data, if already exists in Hist, accumulate a number of such data by one; if not exist, place the data into Hist and set an initial value to one;

6) After all the data has been scanned, calculate how many different pieces of data (Value) in Hist to get a value for Distinct.

In a data storage method according to an embodiment of the present disclosure, at step S13, while obtaining the statistical information of the respective data in the columns, the method further includes:

building indexes of the columns in the table by scanning the data in the table, wherein the indexes of the columns includes mapping relationships between the respective data in the columns and corresponding row numbers of rows in the table, the mapping relationships being sorted according to data sizes of the columns.

The present embodiment adopts a columnar storage structure. By building indexes of the columns in the table, it is convenient to quickly obtain query results by querying the indexes at subsequent stages.

In a data storage method according to an embodiment of the present disclosure, building indexes of the columns in the table includes:

building indexes of all the columns in the table.

Figure 3:
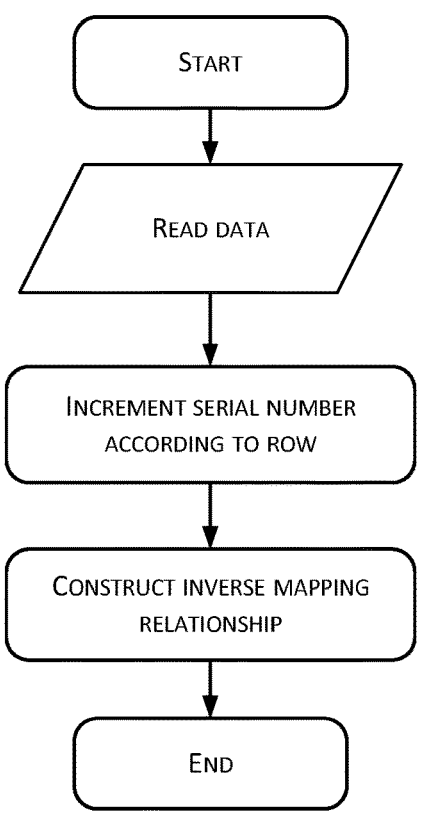
FIG. 3 shows a flowchart of index construction according to an embodiment of the present disclosure.

Specifically, as shown in FIG. 3, a method 300 of establishing an index for each column in the table may include the following steps.

1) After storing each piece of data in a table including rows and columns, the data has been stored in a form of a table composed of rows and columns. First, the rows in the table are sequentially assigned with serial numbers in an ascending order, and are identified using DocId. For example, the first row DocId=1, the second row DocId=2, and so on. The following operations are then performed for each row.

2) Each row of data has used DocId to identify a serial number of the respective row in the previous step, and each row in the table has been split into multiple columns. Therefore, for data (Value) on a cell in the table, a mapping relationship from the value of the cell to DocId can be constructed: Value→DocId.

Figure 4:
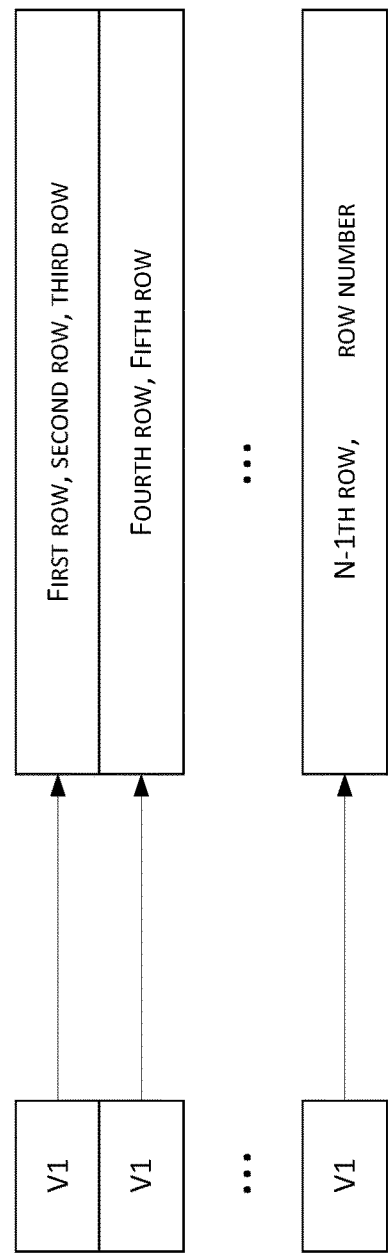
FIG. 4 shows a structural diagram of an index storage of a column according to an embodiment of the present disclosure.

3) When data in multiple cells in a column is the same, the following mapping relationship: Value→DocId1, DocId2, DocId3 . . . , can be obtained, i.e., a mapping of a piece of data to row numbers where the data is located. A structural diagram of a storage format 400 may be as shown in FIG. 4, wherein data V1, V2, V3 . . . Vn is increased gradually.

When indexes are constructed for all the columns of the table, a full index structure of the table is obtained. In a subsequent query, a user inputs data to be searched. A corresponding row number (DocID) set can be found through the above mapping relationship, and corresponding rows can then be read from the DocId set.

The full index technology of all columns is adopted in the present embodiment. Each column has a separate index structure, which ensures that subsequent queries on any condition and any column can use the pre-selection ability of indexes, thus reducing the use of disk reads and writes.

In a data storage method according to an embodiment of the present disclosure, building the indexes of the columns in the table also includes:

establishing an association relationship between the indexes of the columns in the table.

In the present embodiment, by establishing the association relationship between the indexes of the columns in the table, it is convenient for subsequent queries to make full use of association information between multiple indexes, and rewrite an original query condition into an equivalent query condition with the least cost and the most optimal performance, further improving the capability of data filtering and reducing the use of disk reads and writes consumption.

According to another aspect of the present disclosure, a method for querying data stored by using the data storage methods of the foregoing embodiments is also provided. The method includes:

obtaining query condition(s);

obtaining a row number set of rows corresponding to stored data satisfying the query condition(s) according to index information of stored columns.

In a data query method according to an embodiment of the present disclosure, obtaining the row number set of the rows corresponding to the stored data satisfying the query condition(s) according to the index information of the stored columns includes:

determining a corresponding query mode according to the statistical information of the data in the columns, and obtaining the row number set of the rows corresponding to the stored data satisfying the query condition(s) according to the query mode and the index information of the stored columns.

In a data query method according to an embodiment of the present disclosure, before obtaining the row number set of data satisfying each individual query condition, the method further includes:

combining a plurality of individual query conditions into a single query condition according to an association relationship between the index information of the stored columns, wherein the index information of the columns includes mapping relationships between the data in the columns and row numbers of stored rows, the mapping relationships being sorted according to respective data sizes of the columns.

In a data query method according to an embodiment of the present disclosure, combining the plurality of individual query conditions into the single query condition according to the association relationship between the index information of the stored columns includes:

combining a respective result from an obtained row number set of data that satisfies each individual query condition each time according to a combination of the query conditions to obtain a combined result; and aggregating the combined results.

In a data query method according to an embodiment of the present disclosure, the statistical information of the data in the columns includes one or more of: maximum values and minimum values of the data in the columns, mapping relationships between null values in the columns and row numbers, a number of occurrences of each data in the columns and numbers of different data in the columns.

In a data query method according to an embodiment of the present disclosure, the query condition(s) include(s) one or more of a null value query, an equivalent query, and a range query.

In a data query method according to an embodiment of the present disclosure, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are a null value query, determining a query mode that uses the mapping relationships between the null values in the columns and the row numbers for performing a search according to the statistical information of the mapping relationships between the null values in the columns and the row numbers; and obtaining the row number set of the rows corresponding to the data satisfying the query condition(s) from a table according to the query mode and the index information of the stored columns.

In a data query method according to an embodiment of the present disclosure, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query or a range query, obtaining columns to be queried and data to be queried from individual query conditions;

determining whether a range between a maximum value and a minimum value of data of a column to be queried in each individual query condition is within a range between a maximum value and a minimum value of data in the statistical information of the column, if being not within the range, returning a null set; and if being within the range, determining the corresponding query mode according to the statistical information of the data in the columns, and obtaining the row number set of the rows corresponding to the stored data satisfying the query condition(s) according to the query mode and the index information of the columns.

In a data query method according to an embodiment of the present disclosure, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query, obtaining a number of occurrences of data to be queried in a column from the number of occurrences of each data in the statistical information of the columns, and determining whether a percentage of the number of occurrences of the data to be queried with respect to a total number of rows in the column exceeds a preset percentage threshold;

if affirmative, scanning all the data in the column to obtain the row number set of the data that satisfies the individual query conditions; and If not, searching for the row number set of data that satisfies the individual query conditions from the index information of the columns.

In a data query method according to an embodiment of the present disclosure, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are an equivalent query, estimating a number of occurrences of data to be queried in a column according to a number of rows in the column and a number of different data in the statistical information of the columns, and determining whether the estimated number of occurrences of the data to be queried with respect to a total number of rows in the column exceeds a preset percentage threshold;

if affirmative, scanning all the data in the column to obtain a row number set of data that satisfies the individual query conditions; and if not, searching for the row number set of data that satisfies the individual query conditions from the index of the column.

In a data query method according to an embodiment of the present disclosure, determining the corresponding query mode according to the statistical information of the data in the columns, and obtaining the row number set of the rows corresponding to the stored data satisfying the query condition(s) according to the query mode and the index information of the stored columns, include:

when the query condition(s) is/are a range query, comparing whether a range between a maximum value and a minimum value of data of a column to be queried in the query condition is a preset range threshold of a range between a maximum value and a minimum value of the data in the statistical information of the column;

if affirmative, scanning all data in the column to obtain a row number set of data that satisfies the query condition; and if not, using the maximum value and the minimum value of the data to be queried in the column as a starting point and an ending point of a search respectively, to search for a row number set of the data satisfying the query condition(s) from an index of the column.

A data query method according to an embodiment of the present disclosure includes:

Step S21: Obtain query condition(s);

Step S22: Determine a corresponding query mode according to statistical information of respective data in columns of a table, and obtain a row number set of rows corresponding to data in the table that fulfills the query condition(s) according to the query mode, wherein the table includes rows and columns, the rows in the table being compiled with row numbers.

In the present embodiment, the statistical information of the respective data in the columns is used when performing a query to estimate a cost, and a data query mode with the lowest cost and the best performance is obtained to improve the query efficiency.

In a data query method according to an embodiment of the present disclosure, if the obtained query condition(s) is/are a combination of multiple query conditions, determining the corresponding query mode according to the statistical information of the respective data in the columns of the table, and obtaining the row number set of the rows corresponding to the data in the table that fulfills the query condition(s) according to the query mode at step S22, includes:

splitting the combination of the multiple query conditions into individual query conditions, for example, split the multiple query conditions into a plurality of individual query conditions according to logical operators such as AND, OR, NOT, etc;

determining the corresponding query method according to the statistical information of the respective data in the columns of the table, and obtaining a respective row number set of data satisfying each individual query condition according to the query mode;

combining obtained row number sets of data that meets all the individual query conditions according to the combination of the multiple query conditions.

Splitting the combination of the multiple query conditions into individual query conditions can further improve the query efficiency.

In a data query method according to an embodiment of the present disclosure, the query condition(s) include(s) one or more of a null value query, an equivalent query, and a range query.

Specifically, a null value query is mainly responsible for processing a query for data of a specified column that is null, and a compound query composed of a number of such queries through AND, OR, and/or NOT.

An equivalent query is mainly responsible for processing a query where a specified column is equal to specific data, and a query that is formed by such basic queries through logical operators such as AND, OR, and/or NOT, etc. For example, ID=5, Name=lucy AND Addr=USA, etc.

A range query is mainly responsible for processing whether a particular column is within a certain range, and a compound query that is formed by a number of such queries through logical operators such as AND, OR, and/or NOT, etc. For example, ID>3 or ID>2 AND ID<5, etc.

In a data query method according to an embodiment of the present disclosure, before obtaining the row number set of the data satisfying each individual query condition according to the statistical information of the respective data in the columns of the table, the method further includes:

combining a plurality of individual query conditions into a single query condition according to an association relationship between the index information of the columns of the table, wherein the index information of the columns includes mapping relationships between the data in the columns and row numbers of rows of the table, the mapping relationships being sorted according to respective data sizes of the columns.

During executions of the above-mentioned equivalent query, range query, and null value query, an association relationship between different indexes may be used. Based on the association relationship between the indexes, it is possible to perform a combination operation on multiple conditions such as AND, OR, and NOT, etc. For example, a query of DATE>20170202 AND TIME>'20170202 12:12:00', these two conditions can be combined into a condition of TIME>'20170202 12:12:00' using an association relationship between DATE and TIME, which further reduces the cost of index queries.

In a data query method according to an embodiment of the present disclosure, combining the obtained row number sets of the data that meets all the individual query conditions according to the combination of the multiple query conditions, includes:

combining a respective result from an obtained row number set of data that satisfies each individual query condition each time according to a combination of the query conditions to obtain a combined result; and aggregating the combined results.

Figure 5:
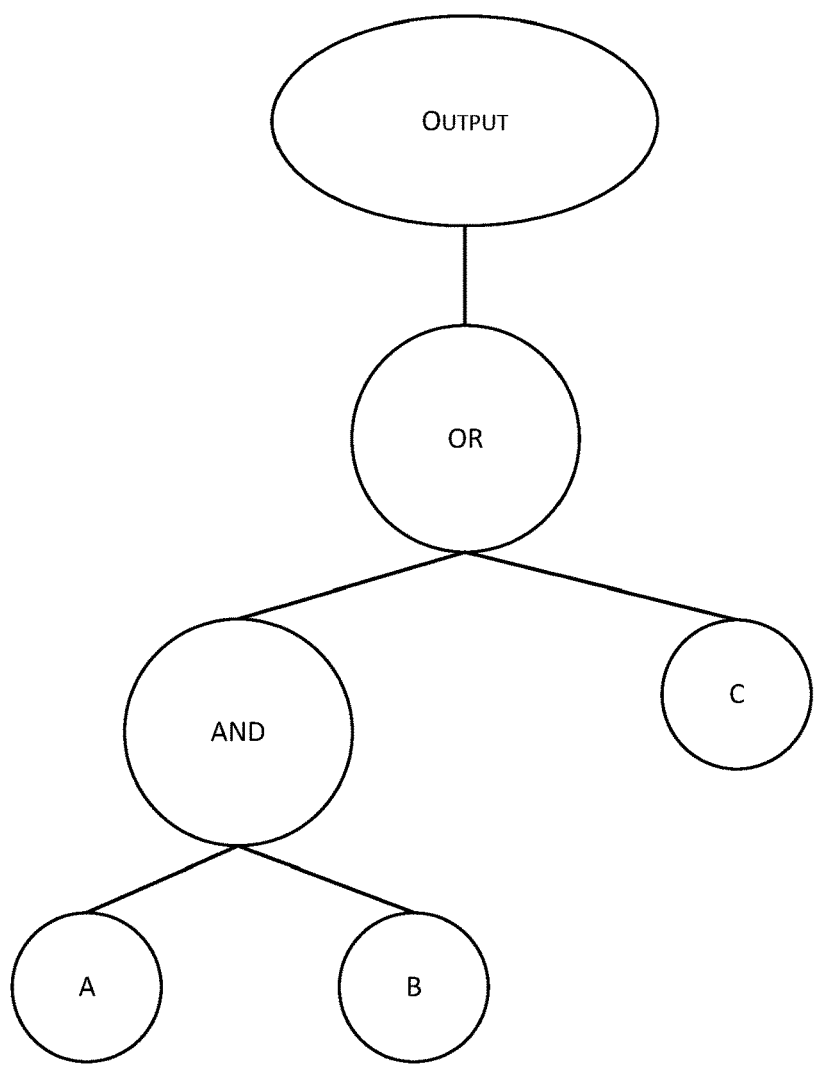
FIG. 5 shows an example diagram of a combination tree of query results according to an embodiment of the present disclosure.
Figure 6:
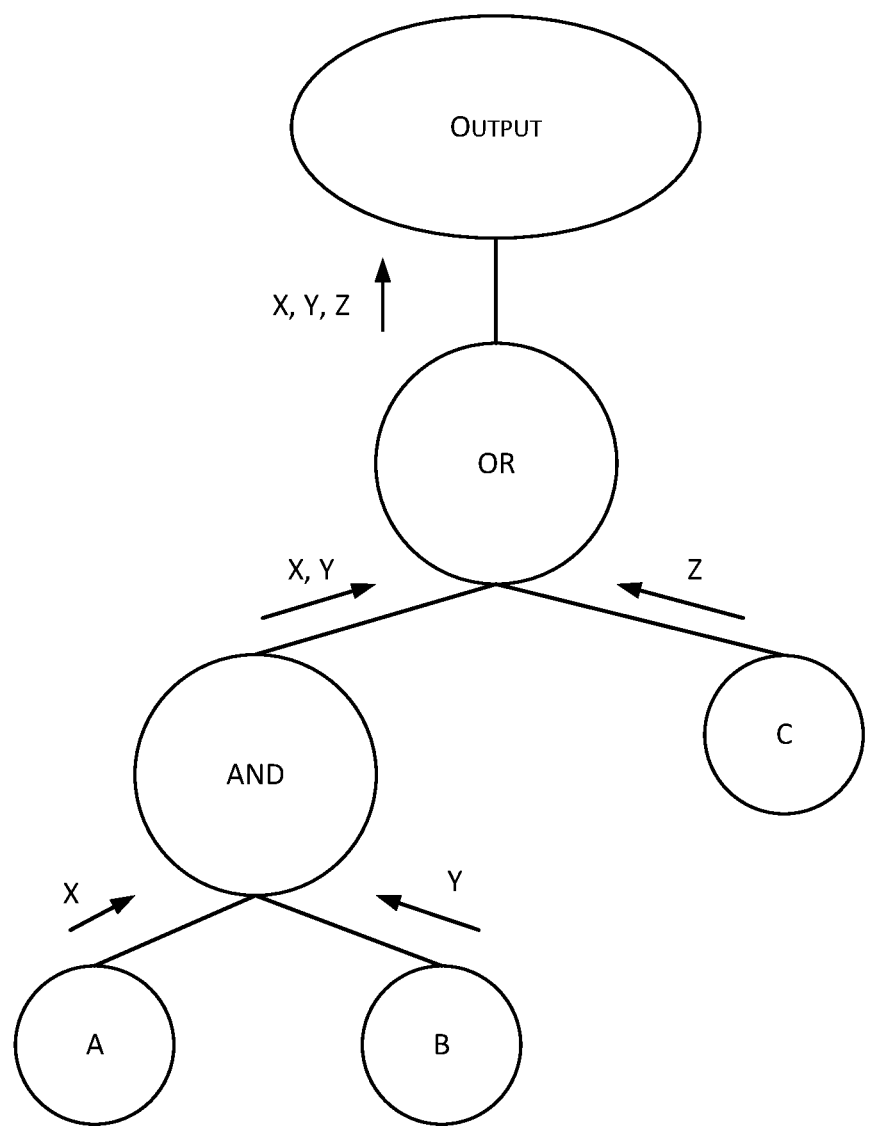
FIG. 6 shows a diagram of an example combination according to an embodiment of the present disclosure.

Specifically, a processing flow of the present embodiment may include the following steps:

1) Separately obtain a respective row set satisfying each of the individual query conditions after processing by the query optimization module;

2) Construct a result combination tree 500 as shown in FIG. 5 from the individual query conditions according to a logical relationship in original query conditions, such as AND, OR, NOT, etc;

3) as shown in FIG. 6, each time taking a result starting from a leaf node of a respective row set satisfying each of the individual query conditions, tracing up along branches until a root node is reached, and performing logical operations according to intermediate nodes; and 4) terminating a calculation process early if a row set collected from the root node satisfies a result requirement.

The present embodiment adopts a streaming combination method, which minimizes the cost of combining multiple index query result sets, saves system resources, accelerates the calculation process, and improves query performance.

In a data storage method according to an embodiment of the present disclosure, the statistical information of the respective data in the columns may include one or more of: a maximum value (Max), a minimum value (Min), a mapping relationship between a null value (Null) in a column and a row number, a number of occurrences of each piece of data in the column (histogram, His), and a number of different pieces of data in the column (a number of distinct values, Distinct).

In a data query method according to an embodiment of the present disclosure, when the query condition(s) is/are a null value query, determining the corresponding query mode according to the statistical information of the respective data in the columns of the table, and obtaining the row number set of the rows corresponding to the data satisfying the query condition(s) in the table according to the query mode, include:

determining a query mode that uses the mapping relationships between the null values in the columns of the table and the row numbers for performing a search according to the statistical information of the mapping relationships between the null values in the columns of the table and the row numbers; and obtaining the row number set of the rows corresponding to the data satisfying the query condition(s) in the table according to the query mode.

Steps of querying a null value by searching statistical null information can be as follows:

1) Split a composite query into multiple individual query conditions according to AND, OR, and/or NOT;

2) Search for a Null→DocId mapping relationship that has been established in an index to obtain a set of rows that satisfy a respective individual query condition for each individual query condition.

In a data query method according to an embodiment of the present disclosure, determining the corresponding query mode according to the statistical information of the respective data in the columns of the table, and obtaining the row number set of the rows corresponding to the data satisfying the query condition(s) in the table according to the query mode, include:

determining the corresponding query method according to the statistical information of the respective data in the columns of the table, and obtaining the row number set of the rows corresponding to the data satisfying the query condition(s) in the table according to the query mode and indexes of the columns in the table.

According to the query mode and the indexes of the columns in the table, obtaining the row number set of the rows corresponding to the data that satisfies the query condition(s) in the table can further improve the query efficiency.

In a data query method according to an embodiment of the present disclosure, when the query condition(s) is/are an equivalent query or a range query, determining the corresponding query mode according to the statistical information of the respective data in the columns of the table, and obtaining the row number set of the rows corresponding to the data satisfying the query condition(s) in the table according to the query mode and the indexes of the columns in the table, include:

obtaining the columns to be queried and data to be queried from the individual query conditions;

determining whether a range between a maximum value and a minimum value of data of a column to be queried in each individual query condition is within a range between a maximum value and a minimum value of data in the statistical information of the column;

if being not within the range, returning a null set; and if being within the range, determining the corresponding query mode according to the statistical information of the data in the columns of the table, and obtaining the row number set of the rows corresponding to the data satisfying the query condition(s) in the table according to the query mode and the index information of the columns of the table.

Upon determining that the range between the maximum value and the minimum value of the data of the column to be queried in each individual query condition is not within the range between the maximum value and the minimum value of the data in the statistical information of the column, this indicates that no data that fulfills the condition exists, and a determination can be made that a query mode is to end the query and return an empty set, so as to improve the query efficiency.

In a data query method according to an embodiment of the present disclosure, when the query condition(s) is/are an equivalent query, determining the corresponding query mode according to the statistical information of the respective data in the columns of the table, and obtaining the row number set of the rows corresponding to the data satisfying the query condition(s) in the table according to the query mode and the indexes of the columns in the table, include:

obtaining a number of occurrences of data to be queried in a column from the number of occurrences of each data in the statistical information of the columns, and determining whether a percentage of the number of occurrences of the data to be queried with respect to a total number of rows in the column exceeds a preset percentage threshold;

if affirmative, scanning all the data in the column to obtain the row number set of the data that satisfies the individual query conditions; and If not, searching for the row number set of data that satisfies the individual query conditions of an index of the column.

Figure 7:
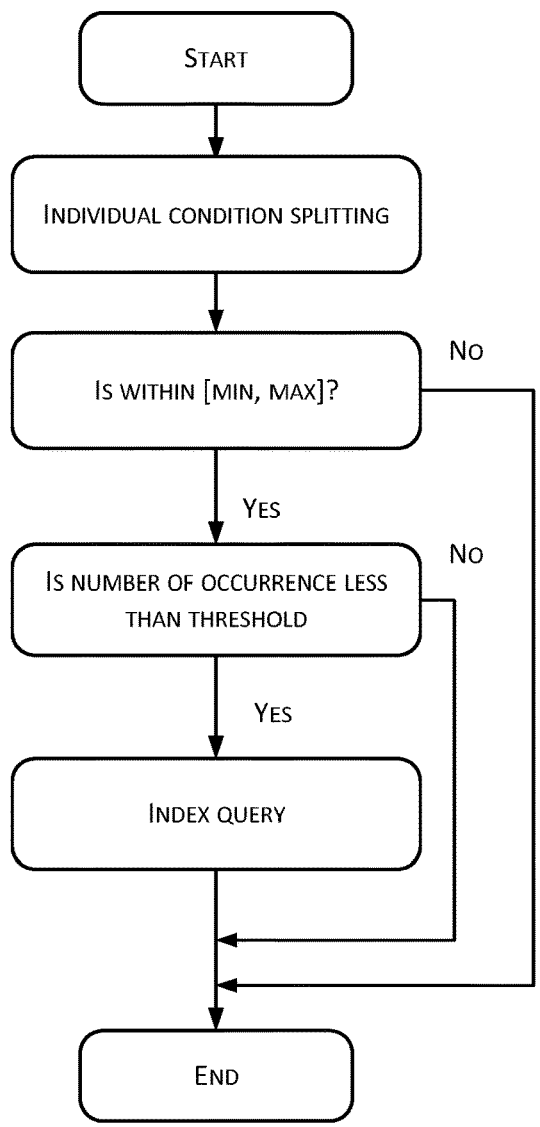
FIG. 7 shows a flowchart of a process of an equivalent query according to an embodiment of the present disclosure.

Specifically, as shown in FIG. 7, of a method 700 for performing an equivalent query in the present embodiment may include:

1) Split the query condition(s) into multiple individual query conditions according to logical operators such as AND, OR, NOT, and separately perform the following steps.

2) Check a Min and a Max of each column involved in each individual query condition, and confirm whether a value to be searched is within a range of [Min, Max]. If not being within the range, this means that no data that meets the condition exists. If being within the range, a next step is performed.

3) Check a Hist histogram to confirm how many times the value to be searched appears in the column. If a percentage of a total number of rows occupied by the number of occurrences exceeds a certain threshold, a current search process is stopped, and a change to direct scanning of all data in the column is performed. If the percentage of the total number of rows occupied by the number of occurrences is less than the certain threshold, a next step is performed.

4) Find a DocId set corresponding to the value through an established index of the column, that is, obtain a set of all rows satisfying each individual query condition.

5) Obtain a set of row numbers that satisfy each individual query condition after the above steps are performed on all columns.

In the present embodiment, by obtaining a number of occurrences of a piece of data to be queried in a column from numbers of occurrences of each piece of data in statistical information of the column, a determination is made as to whether a percentage of a total number of rows that the obtained number of occurrences of the piece of data to be queried accounts for exceeds a preset percentage threshold, and thereby a preferred query mode is determined to improve the query efficiency.

In a data query method according to an embodiment of the present disclosure, when the query condition is an equivalent query, determining the corresponding query mode according to the statistical information of the respective data in the columns of the table, and obtaining the row number set of the rows corresponding to the data satisfying the query condition(s) in the table according to the query mode and the indexes of the columns in the table, include:

estimating a number of occurrences of data to be queried in a column according to a number of rows in the column and a number of different data in the statistical information of the columns, and determining whether the estimated number of occurrences of the data to be queried with respect to a total number of rows in the column exceeds a preset percentage threshold;

if affirmative, scanning all the data in the column to obtain a row number set of data that satisfies the individual query conditions; and if not, searching for the row number set of data that satisfies the individual query conditions from the index of the column.

A difference between the present embodiment and the previous embodiment is that: a number of occurrences of the data to be queried in a column is estimated according to a number of rows in the column and a number of different pieces of data in statistical information of the column, and a determination is made as to whether a percentage of a total number of rows in the column that the estimated number of occurrences of the data to be queried accounts for exceeds a preset percentage threshold, which thereby determines a preferred query mode, and is also able to improve the query efficiency.

In a data query method according to an embodiment of the present disclosure, when the query condition is a range query, determining the corresponding query mode according to the statistical information of the respective data in the columns of the table, and obtaining the row number set of the rows corresponding to the data satisfying the query condition(s) in the table according to the query mode and the indexes of the columns in the table, include:

comparing whether a range between a maximum value and a minimum value of data of a column to be queried in the query condition is a preset range threshold of a range between a maximum value and a minimum value of the data in the statistical information of the column;

if affirmative, scanning all data in the column to obtain a row number set of data that satisfies the query condition; and if not, using the maximum value and the minimum value of the data to be queried in the column as a starting point and an ending point of a search respectively, to search for a row number set of the data satisfying the query condition(s) from an index of the column.

Figure 8:
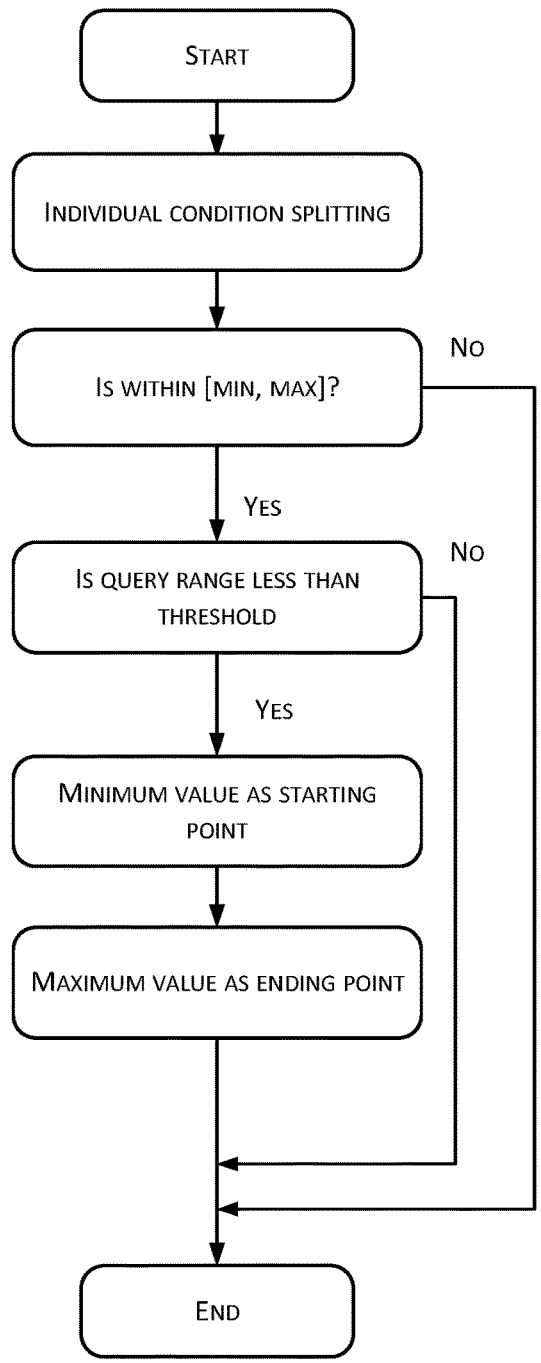
FIG. 8 shows a flowchart of a process of a range query according to an embodiment of the application.

Specifically, as shown in FIG. 8, a method 800 for performing a range query in the present embodiment may include:

1) Split a combined query into multiple individual query conditions according to AND, OR, NOT, etc.

2) Compare each individual query condition based on range information [Min, Max] of a column that is involved; if a query range is not within the range, an empty set is returned; if the query range is within this range, the following steps are performed.

3) Compare a range in an individual query condition with [Min, Max]; if a scope of coverage of a query range is one half or more than one half of [Min, Max], a current index query process is stopped, and the condition is changed to searching all the data in that column by direct scanning; if the scope of coverage is less than one half of [Min, Max], a next step is performed.

4) Use a minimum value of a data range in the query condition as a starting point, and use a maximum value of the data range in the query condition as an ending point.

5) Perform a search in a constructed index, collect all the values from the starting point to the ending point and a set of rows corresponding to these values, i.e., obtain a set of all the rows of data that fulfills a query of the individual query condition.

According to another aspect of the present disclosure, a data storage device is also provided. The device includes:

a data formatting module configured to store data according to a row and column storage structure; and an index building module configured to perform index construction on columns of the stored data to establish index information.

According to another aspect of the present disclosure, a device for querying data stored by the above data storage device is also provided. The device includes:

query optimization and data query modules configured to obtain query condition(s), and obtain a row number set of rows corresponding to stored data that satisfies the query condition(s) according to index information of stored columns.

According to another aspect of the present disclosure, a computing-based device is also provided, which includes:

processor(s); and memory arranged to store computer-executable instructions, the computer-executable instructions, when executed, causing the processor(s) to:

store data according to a row and column storage structure; and perform an index construction on columns of the stored data to establish index information.

According to another aspect of the present disclosure, a computing-based device is also provided, which includes:

processor(s); and memory arranged to store computer-executable instructions, the computer-executable instructions, when executed, causing the processor(s) to:

obtain query condition(s); and obtain a row number set of rows corresponding to stored data satisfying the query condition(s) according to index information of stored columns.

The present invention also provides a computer-readable storage medium, on which computer-executable instructions are stored, wherein the computer-executable instructions, when executed by processor(s), cause the processor(s) to:

store data according to a row and column storage structure; and perform an index construction on columns of the stored data to establish index information.

The present invention also provides a computer-readable storage medium, on which computer-executable instructions are stored, wherein the computer-executable instructions, when executed by processor(s), cause the processor(s) to:

obtain query condition(s); and obtain a row number set of rows corresponding to stored data that satisfies the query condition(s) according to index information of stored columns.

Specific content of the device embodiments of the present disclosure can be referenced to corresponding parts of the method embodiments, which will not be repeated herein.

Apparently, one skilled in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure also intends to include these modifications and variations.

It should be noted that the present disclosure may be implemented in software and/or a combination of software and hardware. For example, the present disclosure may be implemented using an application specific integrated circuit (ASIC), a general purpose computer, or any other similar hardware device. In an embodiment, a software program of the present disclosure may be executed by a processor to implement the steps or functions described above. Likewise, the software program of the present disclosure (including related data structures) can be stored in computer-readable recording media, such as a RAM storage device, a magnetic or optical drive, or a floppy disk, and similar devices. In addition, some steps or functions of the present disclosure may be implemented by hardware, for example, as a circuit that cooperates with a processor to perform various steps or functions.

In addition, a part of the present disclosure may be applied as a computer program product, for example, computer program instructions. When the computer program instructions are executed by a computer, the method and/or technical solution according to the present disclosure may be invoked or provided through operations of the computer. The program instructions for invoking the method of the present disclosure may be stored in a fixed or removable recording medium, and/or transmitted through a data stream in a broadcast or other signal-bearing medium, and/or stored in a working memory of a computer device that runs in accordance with the program instructions. An embodiment according to the present disclosure includes an apparatus, the apparatus including a memory configured to store computer program instructions and a processor configured to execute the program instructions, wherein the computer program instructions, when being executed by the processor, trigger the device to run the methods and/or technical solutions according to the aforementioned embodiments of the present disclosure.

It is apparent to one skilled in the art that the present disclosure is not limited to the details of the above exemplary embodiments, and that the present disclosure can be implemented in other specific forms without departing from the spirit or basic features of the present disclosure. Therefore, regardless of which point of view, the embodiments should be regarded as exemplary and non-limiting. The scope of the present disclosure is defined by the appended claims rather than the above description, and is therefore intended to fall within all changes within the meaning and scope of the equivalent elements of the claims that are included in the present disclosure. Any reference labels of the drawings in the claims should not be considered as limiting the claims that are involved. In addition, the term "include" apparently does not exclude other units or steps, and a singular form does not exclude a plural form. Multiple units or apparatuses stated in the apparatus claims can also be implemented by one unit or apparatus through software or hardware. Terms such as "first" and "second" are used to indicate names, and do not represent any particular order.

The present disclosure can be further understood using the following clauses.

Clause 1: A data storage method comprising: storing data according to a row and column storage structure; and performing an index construction on columns of the stored data to establish index information.

Clause 2: The method of Clause 1, further comprising: obtaining, for a column of the stored data, statistical information of data in the column.

Clause 3: The method of Clause 2, wherein the statistical information of the data in the column comprises one or more of: maximum and minimum values of numbers in the column, a mapping relationship between null values in the column and row numbers, a number of occurrences of each piece of data in the column, and a number of different pieces of data in the column.

Clause 4: The method of Clause 1, wherein performing the index construction on the columns of the stored data to establish the index information comprises: establishing index information of the stored columns by scanning the stored data, the index information of the columns including mapping relationships between data in the columns and row numbers of rows in a table, and the mapping relationships being ordered according to respective data sizes of the columns.

Clause 5: The method of Clause 4, wherein establishing the index information of the stored columns comprises: creating index information for all the stored columns.

Clause 6: The method of Clause 4, wherein while establishing the index information of the stored columns, the method further comprises: establishing an association relationship between the index information of the stored columns.

Clause 7: A method for querying data that is stored using the data storage method of any one of Clauses 1-6, the method comprising: obtaining query condition(s); and obtaining a row number set of rows corresponding to stored data satisfying the query condition(s) according to index information of stored columns.

Clause 8: The method of Clause 7, wherein obtaining the row number set of the rows corresponding to the stored data satisfying the query condition(s) according to the index information of the stored columns comprises: determining a corresponding query mode according to statistical information of data in the columns, and obtaining the row number set of the rows corresponding to the stored data satisfying the query condition(s) according to the query mode and the index information of the stored columns.

Clause 9: The method of Clause 8, wherein: before obtaining a row number set of rows corresponding to stored data satisfying each individual query condition, the method further comprises: combining a plurality of individual query conditions into a single query condition according to an association relationship between the index information of the stored columns, wherein the index information of the columns includes mapping relationships between the data in the columns and row numbers of stored rows, the mapping relationships being sorted according to respective data sizes of the columns.

Clause 10: The method of Clause 9, wherein combining the plurality of individual query conditions into the single query condition according to the association relationship between the index information of the stored columns comprises: combining a respective result from an obtained row number set of data that satisfies each individual query condition each time according to a combination of the query conditions to obtain a combined result; and aggregating the combined results.

Clause 11: The method of Clause 9, wherein the statistical information of the data in the columns includes one or more of: maximum values and minimum values of the data in the columns, mapping relationships between null values in the columns and row numbers, a number of occurrences of each data in the columns and numbers of different data in the columns.

Clause 12: The method of Clause 9, wherein the query condition(s) comprise(s) one or more of a null value query, an equivalent query, and a range query.

Clause 13: The method of Clause 12, wherein determining the corresponding query mode according to the statistical information of the data in the columns, and obtaining the row number set of the rows corresponding to the stored data satisfying the query condition(s) according to the query mode and the index information of the stored columns, comprise: when the query condition(s) is/are a null value query, determining a query mode that uses the mapping relationships between the null values in the columns and the row numbers for performing a search according to the statistical information of the mapping relationships between the null values in the columns and the row numbers; and obtaining the row number set of the rows corresponding to the data satisfying the query condition(s) from a table according to the query mode and the index information of the stored columns.

Clause 14: The method of Clause 12, wherein determining the corresponding query mode according to the statistical information of the data in the columns, and obtaining the row number set of the rows corresponding to the stored data satisfying the query condition(s) according to the query mode and the index information of the stored columns, comprise: when the query condition(s) is/are an equivalent query or a range query, obtaining columns to be queried and data to be queried from individual query conditions; determining whether a range between a maximum value and a minimum value of data of a column to be queried in each individual query condition is within a range between a maximum value and a minimum value of data in the statistical information of the column; if being not within the range, returning a null set; and if being within the range, determining the corresponding query mode according to the statistical information of the data in the columns, and obtaining the row number set of the rows corresponding to the stored data satisfying the query condition(s) according to the query mode and the index information of the columns.

Clause 15: The method of Clause 14, wherein determining the corresponding query mode according to the statistical information of the data in the columns, and obtaining the row number set of the rows corresponding to the stored data satisfying the query condition(s) according to the query mode and the index information of the stored columns, comprise: when the query condition(s) is/are an equivalent query, obtaining a number of occurrences of data to be queried in a column from the number of occurrences of each data in the statistical information of the columns, and determining whether a percentage of the number of occurrences of the data to be queried with respect to a total number of rows in the column exceeds a preset percentage threshold; if affirmative, scanning all the data in the column to obtain the row number set of the data that satisfies the individual query conditions; and If not, searching for the row number set of data that satisfies the individual query conditions from the index information of the columns.

Clause 16: The method of Clause 14, wherein determining the corresponding query mode according to the statistical information of the data in the columns, and obtaining the row number set of the rows corresponding to the stored data satisfying the query condition(s) according to the query mode and the index information of the stored columns, comprise: when the query condition(s) is/are an equivalent query, estimating a number of occurrences of data to be queried in a column according to a number of rows in the column and a number of different data in the statistical information of the columns, and determining whether the estimated number of occurrences of the data to be queried with respect to a total number of rows in the column exceeds a preset percentage threshold; if affirmative, scanning all the data in the column to obtain a row number set of data that satisfies the individual query conditions; and if not, searching for the row number set of data that satisfies the individual query conditions from the index of the column.

Clause 17: The method of Claim 14, wherein determining the corresponding query mode according to the statistical information of the data in the columns, and obtaining the row number set of the rows corresponding to the stored data satisfying the query condition(s) according to the query mode and the index information of the stored columns, comprise: when the query condition(s) is/are a range query, comparing whether a range between a maximum value and a minimum value of data of a column to be queried in the query condition is a preset range threshold of a range between a maximum value and a minimum value of the data in the statistical information of the column; if affirmative, scanning all data in the column to obtain a row number set of data that satisfies the query condition; and if not, using the maximum value and the minimum value of the data to be queried in the column as a starting point and an ending point of a search respectively, to search for a row number set of the data satisfying the query condition(s) from an index of the column.

Clause 18: A data storage device comprising: a data formatting module configured to store data according to a row and column storage structure; and an index building module configured to perform index construction on columns of the stored data to establish index information.

Clause 19: A device for querying data stored by the data storage device of claim 18, the device comprising: query optimization and data query modules configured to obtain query condition(s), and obtain a row number set of rows corresponding to stored data that satisfies the query condition(s) according to index information of stored columns.

Clause 20: A computing-based device comprising: processor(s); and memory arranged to store computer-executable instructions, the computer-executable instructions, when executed, causing the processor(s) to: store data according to a row and column storage structure; and perform an index construction on columns of the stored data to establish index information.

Clause 21: A computing-based device comprising: processor(s); and memory arranged to store computer-executable instructions, the computer-executable instructions, when executed, causing the processor(s) to: obtain query condition(s); and obtain a row number set of rows corresponding to data satisfying the query condition(s) according to index information of stored columns.

Clause 22: A computer-readable storage medium, on which computer-executable instructions are stored, wherein the computer-executable instructions, when executed by processor(s), cause the processor(s) to: store data according to a row and column storage structure; and perform an index construction on columns of the stored data to establish index information.

Clause 23: A computer-readable storage medium, on which computer-executable instructions are stored, wherein the computer-executable instructions, when executed by processor(s), cause the processor(s) to: obtain query condition(s); and obtain a row number set of rows corresponding to stored data that satisfies the query condition(s) according to index information of stored columns.

Clause 24: A data storage method comprising: storing data according to a row and column storage structure; and performing an index construction on columns and/or rows of the stored data to establish index information.

What is claimed is:

1. A method implemented by one or more computing devices, the method comprising:
    storing data according to a row and column storage structure;
    performing an index construction on columns of the stored data to establish index information; and
    obtaining, for a column of the stored data, statistical information of data in the column, the statistical information of the data in the column including a mapping relationship between null values in the column and row numbers, a maximum value of numbers in the column and a minimum value of numbers in the column.

2. The method of claim 1, wherein the statistical information of the data in the column further comprises a number of occurrences of each piece of data in the column, and a number of different pieces of data in the column.

3. The method of claim 1, wherein performing the index construction on the columns of the stored data to establish the index information comprises:
    establishing index information of stored columns by scanning the stored data, the index information of the columns including mapping relationships between data in the columns and row numbers of rows in a table, and the mapping relationships being ordered according to respective data sizes of the columns.

4. The method of claim 3, wherein establishing the index information of the stored columns comprises:
    creating the index information for the stored columns.

5. The method of claim 3, wherein while establishing the index information of the stored columns, the method further comprises:
    establishing an association relationship between the index information of the stored columns.

6. The method of claim 1, further comprising:
    obtaining a query condition; and
    obtaining a row number set of rows corresponding to stored data satisfying the query condition according to the index information of the columns.

7. The method of claim 6, wherein obtaining the row number set of the rows corresponding to the stored data satisfying the query condition according to the index information of the columns comprises:
    determining a corresponding query mode according to statistical information of data in the columns, and obtaining the row number set of the rows corresponding to the stored data satisfying the query condition according to the query mode and the index information of stored columns.

8. The method of claim 7, wherein: before obtaining the row number set of rows corresponding to the stored data satisfying the query condition, the method further comprises:
    combining a plurality of individual query conditions into a single query condition according to an association relationship between the index information of the stored columns, wherein the index information of the columns includes mapping relationships between the data in the columns and row numbers of stored rows, the mapping relationships being sorted according to respective data sizes of the columns.

9. The method of claim 8, wherein combining the plurality of individual query conditions into the single query condition according to the association relationship between the index information of the stored columns comprises:
    combining a respective result from an obtained row number set of data that satisfies each individual query condition each time according to a combination of the individual query conditions to obtain a combined result; and
    aggregating the combined results.

10. The method of claim 8, wherein the statistical information of the data in the columns includes one or more of: maximum values and minimum values of the data in the columns, mapping relationships between null values in the columns and row numbers, a number of occurrences of each data in the columns and numbers of different data in the columns.

11. The method of claim 8, wherein the query condition comprises one or more of a null value query, an equivalent query, and a range query.

12. The method of claim 11, wherein determining the corresponding query mode according to the statistical information of the data in the columns, and obtaining the row number set of the rows corresponding to the stored data satisfying the query condition according to the query mode and the index information of the stored columns, comprise:
    when the query condition is a null value query, determining a query mode that uses the mapping relationships between the null values in the columns and the row numbers for performing a search according to the statistical information of the mapping relationships between the null values in the columns and the row numbers; and
    obtaining the row number set of the rows corresponding to the data satisfying the query condition from a table according to the query mode and the index information of the stored columns.

13. The method of claim 11, wherein determining the corresponding query mode according to the statistical information of the data in the columns, and obtaining the row number set of the rows corresponding to the stored data satisfying the query condition according to the query mode and the index information of the stored columns, comprise:
    in response to determining that the query condition is an equivalent query or a range query, obtaining columns to be queried and data to be queried from individual query conditions;
    determining whether a range between a maximum value and a minimum value of data of a column to be queried in each individual query condition is within a range between the maximum value and the minimum value of data in the statistical information of the column,
    if being not within the range, returning a null set; and
    if being within the range, determining the corresponding query mode according to the statistical information of the data in the columns, and obtaining the row number set of the rows corresponding to the stored data satisfying the query condition according to the query mode and the index information of the columns.

14. The method of claim 11, wherein determining the corresponding query mode according to the statistical information of the data in the columns, and obtaining the row number set of the rows corresponding to the stored data satisfying the query condition according to the query mode and the index information of the stored columns, comprise:
    in response to determining that the query condition is an equivalent query, obtaining a number of occurrences of data to be queried in a column from the number of occurrences of each data in the statistical information of the columns, and determining whether a percentage of the number of occurrences of the data to be queried with respect to a total number of rows in the column exceeds a preset percentage threshold;
    if affirmative, scanning the data in the column to obtain the row number set of the data that satisfies the individual query conditions; and
    If not, searching for the row number set of data that satisfies the individual query conditions from the index information of the columns.

15. The method of claim 11, wherein determining the corresponding query mode according to the statistical information of the data in the columns, and obtaining the row number set of the rows corresponding to the stored data satisfying the query condition according to the query mode and the index information of the stored columns, comprise:
    in response to determining that the query condition is an equivalent query, estimating a number of occurrences of data to be queried in a column according to a number of rows in the column and a number of different data in the statistical information of the columns, and determining whether the estimated number of occurrences of the data to be queried with respect to a total number of rows in the column exceeds a preset percentage threshold;
    if affirmative, scanning the data in the column to obtain a row number set of data that satisfies the individual query conditions; and
    if not, searching for the row number set of data that satisfies the individual query conditions from the index of the column.

16. The method of claim 11, wherein determining the corresponding query mode according to the statistical information of the data in the columns, and obtaining the row number set of the rows corresponding to the stored data satisfying the query condition according to the query mode and the index information of the stored columns, comprise:
    in response to determining that the query condition is a range query, comparing whether a range between a maximum value and a minimum value of data of a column to be queried in the query condition is a preset range threshold of a range between the maximum value and the minimum value of the data in the statistical information of the column;

if affirmative, scanning data in the column to obtain a row number set of data that satisfies the query condition; and if not, using the maximum value and the minimum value of the data to be queried in the column as a starting point and an ending point of a search respectively, to search for a row number set of the data satisfying the query condition from an index of the column.

17. A device comprising:

one or more processors; and one or more computer-readable media storing executable instructions that, when executed by the one or more processors, cause the one or more processors to perform acts comprising:

storing data according to a row and column storage structure;

performing index construction on columns of the stored data to establish index information; and obtaining, for a column of the stored data, statistical information of data in the column, the statistical information of the data in the column including a mapping relationship between null values in the column and row numbers.

18. One or more computer-readable media storing executable instructions that, when executed by one or more processors, cause the one or more processors to perform acts comprising:

storing data according to a row and column storage structure;

performing an index construction on columns of the stored data to establish index information; and obtaining, for a column of the stored data, statistical information of data in the column, the statistical information of the data in the column including a mapping relationship between null values in the column and row numbers, a maximum value of numbers in the column and a minimum value of numbers in the column.

19. The one or more computer-readable media of claim 18, the acts further comprising:

obtaining a query condition; and obtaining a row number set of rows corresponding to stored data satisfying the query condition according to the index information of the columns.

* * * * *